United States Patent [19]

Mote, Jr.

[11] Patent Number: 5,630,110

[45] Date of Patent: May 13, 1997

[54] METHOD AND APPARATUS FOR ENHANCING PERFORMANCE OF A PROCESSOR

[75] Inventor: L. Randall Mote, Jr., Laguna Hills, Calif.

[73] Assignee: Samsung Electronics Co., Ltd., Seoul, Rep. of Korea

[21] Appl. No.: 609,357

[22] Filed: Mar. 1, 1996

[51] Int. Cl.[6] ......................................................... G06F 1/08
[52] U.S. Cl. ................................................................. 395/556
[58] Field of Search ........................ 395/550; 331/177 R, 331/177 V

[56] References Cited

U.S. PATENT DOCUMENTS

| | | | |
|---|---|---|---|
| 5,021,679 | 6/1991 | Fairbanks et al. | 307/66 |
| 5,153,535 | 10/1992 | Fairbanks et al. | 331/143 |
| 5,163,146 | 11/1992 | Antanaitis, Jr. et al. | 395/550 |
| 5,307,003 | 4/1994 | Fairbanks et al. | 323/222 |
| 5,319,771 | 6/1994 | Takeda | 395/550 |
| 5,422,806 | 6/1995 | Chen et al. | 364/149 |

Primary Examiner—Thomas M. Heckler
Attorney, Agent, or Firm—Knobbe, Martens, Olson & Bear, L.L.P.

[57] ABSTRACT

An optimum processing frequency is set for processors based upon the individual operational characteristics of each processor. The source voltage supplied to the processor is increased, manually or under software control, to the maximum value specified for the processor. This allows the processor to operate at the maximum possible frequency. The processor clock frequency is varied with respect to the motherboard clock frequency so that the processor clock can be arbitrarily set to its maximum operational frequency. A method of approximation is used to determine the maximum clock frequency at which the processor will function properly. In order to prevent thermally induced semiconductor breakdown, additional heat sinking is performed and/or a thermal management scheme is used. The supply voltage may also be controlled in conjunction with the clock rate to determine the optimum operating frequency and supply voltage to the processor.

8 Claims, 3 Drawing Sheets

5,630,110

METHOD AND APPARATUS FOR ENHANCING PERFORMANCE OF A PROCESSOR

BACKGROUND OF THE INVENTION

1. Field of the Invention

The present invention relates to an apparatus and method for optimizing the processing speed of a microprocessor chip.

2. Description of the Related Art

A well known measure of the performance of a processor chip is the frequency at which the processor chip operates. Processor chips which operate at a higher clock frequency are capable of processing more information in a shorter time than equivalent processor chips which operate at a lower clock frequency. Thus, it is desirable to run a processor chip at the maximum clock frequency which that particular processor chip can operate without causing the processor to operate incorrectly due to internal delays, thermal destruction of the processor, or a degradation of performance due to thermally induced automatic shutdown.

In many cases, processor chips are implemented within a computer system to operate at a clock frequency which is significantly lower than the maximum operational frequency that the processor can sustain without exhibiting the above-mentioned failures or protective shutdown. This may happen for many reasons. For example, because the processor chips are typically categorized into two or three processing speed categories (e.g., 66 MHz, 100 MHz, etc.), many processor chips which are actually capable of running at higher clock rates than the standard clock rate categories are simply set to a lower clock rate in order to conform to the clock rate category for a given computer. Furthermore, processing chip manufacturers sometimes produce an excess of chips which are capable of operating at or above one processing speed class (e.g., 100 Mhz), but due to corporate marketing plans, the manufacturer will artificially market the processor at a slower speed class, keeping speeds down until market pressures demand the higher speed class. Finally, sometimes processing chips are only tested under low voltage conditions. As is well known in the art, when a higher source voltage is applied to a microprocessor chip, this typically acts to increase the maximum clock rate at which the processing chip is capable of operating. This is because the higher voltage results in a reduction of the capacitive time delays throughout the processor circuitry. However, due to thermal considerations, power supply needs and ultimately voltage induced semiconductor breakdown, the source voltage is often kept low on many processing chips. Thus, some processing chips which are capable of running at much higher clock rates are sometimes classified within a slower clock rate category due to the circumstances under which the test was carried out.

One known way of enhancing the performance of a processor is to disable the motherboard clock and to add a higher frequency clock source. However, such an implementation usually requires that all of the system components on the motherboard (e.g., the memory, the motherboard bus, the input/output units, etc.) operate at the increased clock rate. Therefore, such an embodiment cannot be used to improve performance if one of the system components is incapable of operating at the higher clock rate.

Thus, in order to optimize the performance of an individual processing chip, it would be desirable if an apparatus and method for enhancing the clock rate performance of a processor chip could be implemented by after-market manufacturers or individual PC owners.

SUMMARY OF THE INVENTION

A method of enhancing the performance of a variable frequency processor chip in a computer system, wherein the processor chip has a specified maximum voltage level and is powered by a digitally controlled supply voltage, comprises the steps of: applying a digital power supply control value to set the supply voltage to the specified maximum voltage level; applying a first digital value to the processor chip to set a clock rate at which the processor chip operates to an initial frequency; determining if the computer system operates properly when the processor chip is set at the frequency; and, if the computer system does not operate properly when the processor chip is set at the initial frequency, applying different digital values to the processor chip to decrease the clock rate until a maximum clock rate is found at which the processing chip operates properly. If the computer system does operate properly when the processor chip is set at the initial frequency, digital values are applied to increase the clock rate until a maximum clock rate is found at which the computer system operates properly.

In a preferred embodiment, successive approximation is used to increase or decrease the clock rate.

In another preferred embodiment, the method further includes the steps of monitoring the temperature of the processor chip and generating an interrupt to reduce the operating frequency of the processor when the temperature exceeds a threshold value until such time as the processor temperature returns to a safe value, at which time processor is allowed to run at its original clock rate.

In a particularly preferred embodiment, the method includes increased cooling of the processor. In one implementation, a fan or a heat sink could be used to increase cooling of the processor.

Under another aspect, the preferred embodiment of the invention is a method of enhancing the performance of a variable frequency processor chip, wherein the processor chip is powered by a digitally controlled supply voltage. The method comprises the steps of: applying a digital power supply control value to the power supply to set the supply voltage to a voltage level within the operating range of the processor chip; applying a first digital frequency control value to the processor chip to set a clock rate at which the processor chip operates to an initial frequency; determining if the processor chip operates properly at the initial frequency; and applying different digital frequency control values to the processor chip to control the clock rate in conjunction with the supply voltage to determine a maximum clock rate at which the processing chip operates properly.

In a preferred embodiment, successive approximation is used to increase or decrease the clock rate.

In another preferred embodiment, the method further includes the steps of monitoring the temperature of the processor chip and generating an interrupt to reduce the operating frequency of the processor when the temperature exceeds a threshold value until such time as the processor temperature returns to a safe value, at which time processor is allowed to run at its original clock rate.

In yet another preferred embodiment, the method includes increased cooling of the processor. In a particularly preferred embodiment, the heat sinking or a fan are used to provide increased cooling of the processor.

DETAILED DESCRIPTION OF THE INVENTION

Figure 1:
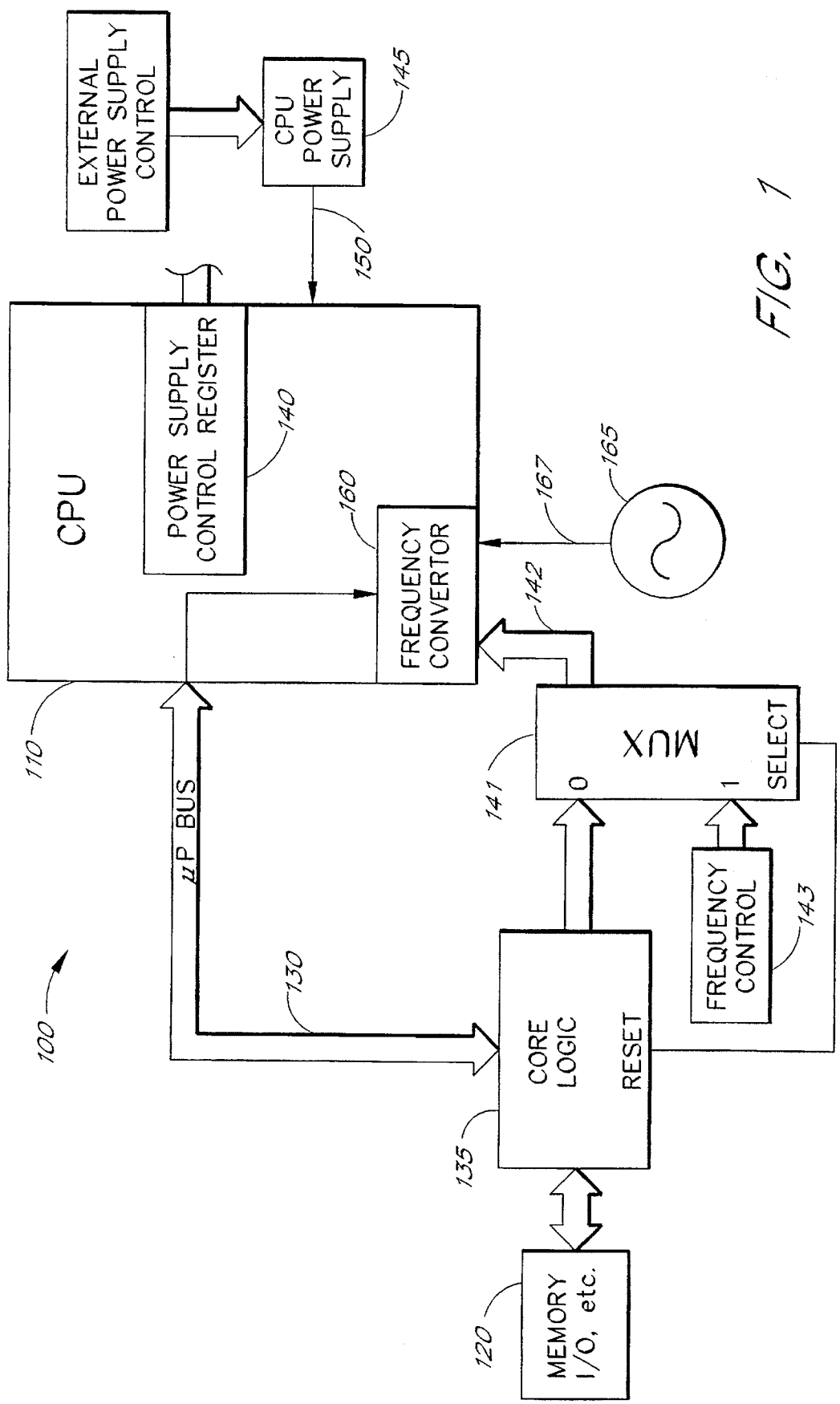
FIG. 1 is a highly simplified block diagram of a computer system which incorporates the processor performance enhancement invention.

FIG. 1 is a highly simplified block diagram of a computer system 100 constructed in accordance with the teachings of the present invention. It will be appreciated by those skilled in the art that the computer system 100 typically includes additional circuitry not shown in FIG. 1 for purposes of clarity in illustrating the present invention. The computer system 100 includes a central processing unit (CPU) 110 which may, for example, comprise a P6 microprocessor chip, available from INTEL. The CPU or processor 110 communicates with other systems, such as memory, input/output (I/O) units, etc., 120 on the motherboard via a microprocessor bus 130 and core logic 135. The processor 110 also includes a power supply control register 140 which stores a voltage control value that is normally used to control the regulation voltage of a CPU power supply 145.

In accordance with one preferred embodiment of the present invention, the lines from the CPU's power supply control register which are used to control the CPU power supply 145 are disconnected and control of the CPU power supply 145 is provided by an external control device such as an array of switches or a separate microcontroller.

The processor 110 includes an internal frequency converter 160 which generates an internal clock frequency derived from the clock frequency supplied to the motherboard system components. The frequency converter 160 receives a clock input from an oscillator 165 via a line 167.

The frequency converter 160 operates at a frequency determined at reset by latching voltage levels on the pins of the CPU 110 as defined by the manufacturer's CPU hardware specification. These pins are driven by multiplexer 141. When reset is not asserted these pins are controlled by the core logic 135. During reset these pins are controlled by frequency control hardware 143 which can be either switches or hardwired jumpers.

As is well known to those of ordinary skill in the art, and as discussed briefly above, the maximum clock rate at which a processor is capable of operating is a function of the source voltage supplied to the processor 110 within a specified range of source voltages as limited by the chip's manufacturer in order to prevent voltage breakdown. However, as the source voltage increases, the likelihood of thermally induced semiconductor breakdown also increases. Thus, the present invention takes advantage of thermal management techniques by thermally managing the processor temperature with system management interrupt (SMI) techniques or by including additional heat sinking, as required by the particular application. SMI causes the processor to be halted or to be slowed down when the temperature of the processor 110 exceeds a certain value. The processor resumes normal operation once the processor 110 cools sufficiently.

It can be seen that, for certain applications, the halting or slowing down of the processor 110 due to SMI may result in the processor 110 actually running at a slower effective rate for a higher supply voltage. In these applications, a balance must be found so that the processor 110 can run at the optimum allowable clock rate for the individual characteristics of that chip. Thus, in accordance with one aspect of the present invention, a method of controlling the source voltage as well as the clock rate supplied to the processor 110 finds the optimum clock frequency at which the processor 110 is able to operate. Furthermore, In this manner, the maximum clock rate for each individual processor can be utilized without risk of shortening the operating life span of the processor 110.

The optimum operating clock rate of the processor 110 can be determined during power-up under the control of the frequency controller 143 using an internal self test of the processor 110. Once this optimum clock rate has been determined, the processor 110 operates normally in conjunction with the system components 120 and 135 on the motherboard. The present invention takes advantage of the variable relationship between the processor clock frequency and the motherboard clock frequency. Because the processor clock frequency can be varied with respect to the motherboard operating frequency, any clock rate may be defined for the processor 110 without affecting the clock rate of the motherboard system components 120 and 135.

Figure 2:
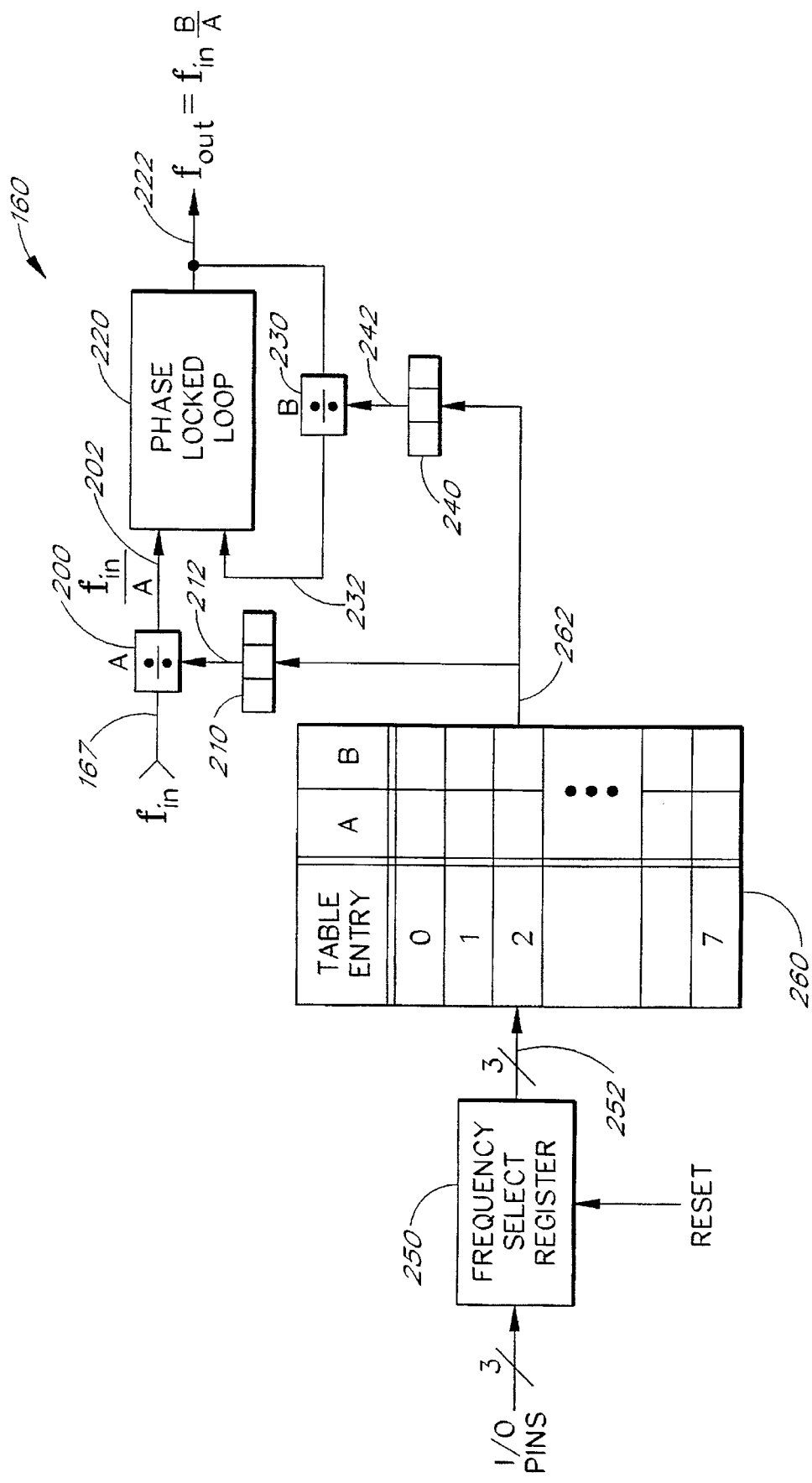
FIG. 2 is a block diagram showing one implementation of the frequency converter portion of the computer system depicted in FIG. 1.

FIG. 2 is a highly simplified block diagram of the frequency converter 160 which is typically included within the processor 110. As shown in FIG. 2, the frequency converter 160 includes a first frequency divider circuit 200, which receives a frequency input over the line 167, and a frequency scaler value from a first three-bit register 210 via a three-bit bus 212. The frequency divided output 202 (equal to the input frequency divided by A, where A is the three-bit scaler input value stored in the first register 210) is provided as a first input 202 to a phase locked loop 220.

The output 222 of the phase locked loop 220 is fed back to a second input 232 of the phase locked loop 220 via a frequency divider circuit 230. The frequency divider circuit 230 divides the frequency of the output signal 222 of the phase locked loop 220 by a scaler value equal to a value stored within a second three-bit register 240. The three-bit scaler value is provided as an input to the frequency divider 230 via a three-bit bus 242.

Because the phase locked loop 220 seeks to maintain equality of the phase and frequency of the signals applied to its first and second inputs, the frequency of the output signal 222 provided by the phase locked loop 220 is equal to the input frequency of signal 167 times B (where B equals the three-bit value stored in the second register 240) divided by A. As long as the output frequency 222 provided by the phase locked loop 220 is equal to the input frequency 167 times B over A, the frequency of the signals applied to both the first and second inputs 202 and 232 of the phase lock loop is equal to the input frequency divided by A. It should be noted here that, in the embodiment where A and B are three-bit binary counters, A and B will typically range in value from 1–8 (decimal). Furthermore, it should be understood that $f_{outmax}=f_{in} \times 8$ and $f_{outmin}=f_{in}÷8$. Since there are eight possible values for both A and B, there are therefore 8×8=64 possible ratios. In this manner, the processor clock can be set to any ratio definable by the scaler values B and A so that the motherboard clock frequency is thereby decoupled from the processor clock frequency. The counter control registers 210 and 240 are typically output from a look-up table 260 implemented in hardware within the processor. Register 250 is used to select one entry from the look-up table. While not necessary for the operation of the frequency converter, the look-up table is usually included to reduce the number of pins required to define the ratio. In the embodiment where registers 250, 210 and 240 are all three bit registers, the 64 possible ratios are reduced to a subset of 8 ratios. The look-up table entry is typically selected by the value stored in the frequency select register 250. This register is loaded at reset time via I/O pins 142 on the CPU 110 as shown in FIG. 1.

Figure 3:
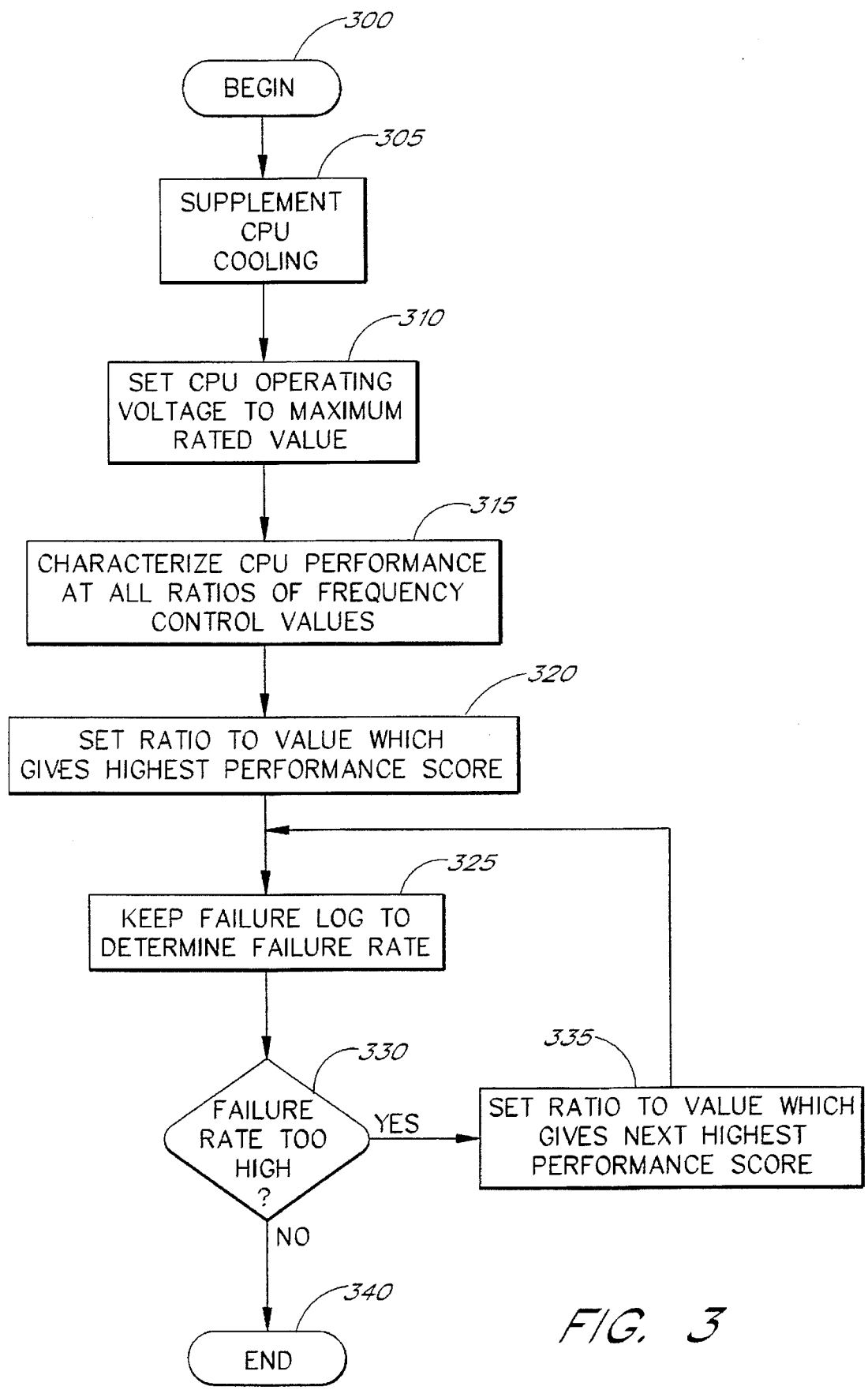
FIG. 3 is a flow diagram which illustrates the general method of increasing the processor performance in accordance with the present invention.

FIG. 3 illustrates the general method of the present invention to set the processor operating clock rate to an optimum value. The method initializes as represented within a begin block 300, and, thereafter, uses one or more techniques to supplement the cooling of the CPU 110, as represented within an activity block 305. As is well known in the art, whenever it is desirable to increase the operating speed of a central processing unit, increased heating typically results due to the increased activity of the CPU. Thus, in order to avoid deleterious effects associated with, for example, thermal breakdown, it is important to supplement the CPU cooling before increasing the operating speed of the CPU 110. In one embodiment, the CPU cooling can be provided for by additional fans or heat sinks, or by using software thermal management which reduces the operating speed of the CPU 110 whenever a temperature threshold is exceeded.

Thereafter, as represented within an activity block 310, the operating voltage of the CPU 110 is set to the maximum rated value. That is, typically a manufacturer for the CPU 110 will provide a specification sheet which indicates the maximum operating voltage value at which the CPU 110 can operate. Since, as is well understood in the art, an increase in operating voltage value typically results in increased operating speed of the CPU 110, by setting the operating voltage of the CPU 110 to a maximum rated value, the performance of the CPU 110 can be enhanced.

Once the operating voltage of the CPU 110 has been set to the maximum rated value, the CPU performance at all ratios of the frequency control values are characterized as represented within an activity block 315. That is, for each of the possible values of A and B (see FIG. 2), a test is performed to determine first if the CPU 110 passes the self-diagnostic test, and, if so, a performance score is determined for that ratio using standard bench-marking software such as the well known NORTON utility available from SEMANTEC CORPORATION. Table 1 is a table which characterizes the frequency control values, designated by a ratio code (i.e., the code loaded into the frequency select register 250 of FIG. 2) for an exemplary CPU 110.

TABLE I

| RATIO CODE | MICROPROCESSOR PASS DIAGNOSTIC? (Y/N) | NORMALIZED PERFORMANCE SCORE |
|---|---|---|
| n | Y | 1.0 |
| n + 1 | Y | 1.14 |
| n + 2 | Y | 1.27 |
| n + 3 | Y | 1.34 |
| n + 4 | N | — |
| n + 5 | N | — |
| n + 6 | N | — |

It should be noted that the performance of the CPU 110 at each of the frequency control ratio values could be provided from the CPU manufacturer's hardware specification manual.

Once the performance of the CPU 110 has been characterized at all ratios of the frequency control values, as represented within the activity block 315, the frequency control value which gives the highest performance score is loaded into the frequency select register 250 to set the ratio corresponding to optimum CPU performance. For example, out of the exemplary values listed in Table 1, the ratio code N+3, having a normalized performance score of 1.34, corresponds to the frequency control value which gives the highest performance score. Thus, the value N+3 will be loaded into the frequency select register 250 to determine the operating speed of the CPU 110.

Thereafter, a failure log is kept to determine the failure rate of the CPU 110, as represented within an activity block 325. The failure log is a record of the number of times the CPU 110 performs a processing error in one embodiment. If it is determined that the failure rate is above a certain threshold, as represented within a decision block 330, then the frequency control ratio value is set to the value which gives the next highest performance score (e.g., the value N+2 in Table 1). After this, the method re-enters the activity block 325 to keep a new failure log. Once it is determined that the failure rate is acceptable, then the CPU 110 remains set at the operating speed provided for by the present frequency control value and the method end is represented within an end block 340. Of course, it should be noted that, although depicted in FIG. 3 as a single step within the method of the present invention, the keeping of a failure log advantageously is calculated continuously throughout the operation of the CPU 110 so that whenever a failure rate exceeds the allowable threshold, the frequency control value is adjusted.

Although the preferred embodiments of the present invention have been described in detail above, it will be understood to those of ordinary skill in the art that obvious modifications could be made to the invention without departing from its spirit or central characteristics. For example, instead of simply controlling the clock rate of the processor independently from the source voltage, the source voltage supplied to the processor 110 and the processing frequency could be controlled in conjunction to determine an optimum clock rate. Furthermore, a successive approximation or other means could be used to manually or automatically select the optimum operating speed of the CPU 110. Thus, the foregoing description could be construed as illustrative and not restrictive. The scope of the present invention should therefore be defined in view of the appended claims.

What is claimed is:

1. A method of enhancing the performance of a variable frequency processor in a computer system, wherein said processor has a specified maximum voltage level and is powered by a digitally controlled supply voltage, said method comprising the steps of:

applying a digital power supply control value to set said supply voltage to said specified maximum voltage level;

applying a first digital value to said processor to set a clock rate at which said processor operates to an initial frequency;

determining if said computer system operates properly when said processor is set at said frequency; and if said computer system does not operate properly when said processor is set at said initial frequency, applying different digital values to said processor to decrease said clock rate until a maximum clock rate is found at which said processing operates properly; and, if said computer system does operate properly when said processor is set at said initial frequency, applying digital values to increase said clock rate until a maximum clock rate is found at which said computer system operates properly.

2. A method as defined in claim 1, wherein successive approximation is used to increase or decrease said clock rate.

3. A method as defined in claim 1, wherein said method further includes the steps of monitoring the temperature of the processor and generating an interrupt to reduce the operating frequency of the processor when the temperature exceeds a threshold value until such time as the processor temperature returns to a safe value, at which time processor is allowed to run at its original clock rate.

4. A method as defined in claim 1, wherein said method includes increased cooling of the processor.

5. A method of enhancing the performance of a variable frequency processor, wherein said processor is powered by a digitally controlled supply voltage, said method comprising the steps of:

applying a digital power supply control value to said power supply to set said supply voltage to a voltage level within the operating range of the processor;

applying a first digital frequency control value to said processor to set a clock rate at which said processor operates to an initial frequency;

determining if said processor operates properly at said initial frequency; and applying different digital frequency control values to said processor to control said clock rate in conjunction with said supply voltage to determine a maximum clock rate at which said processor operates properly.

6. A method as defined in claim 5, wherein successive approximation is used to increase or decrease said clock rate.

7. A method as defined in claim 5, wherein said method further includes the steps of monitoring the temperature of the processor and generating an interrupt to reduce the operating frequency of the processor when the temperature exceeds a threshold value until such time as the processor temperature returns to a safe value, at which time processor is allowed to run at its original clock rate.

8. A method as defined in claim 5, wherein said method includes increased cooling of the processor.

* * * * *